US011084184B2

(12) United States Patent
Ricci et al.

(10) Patent No.: US 11,084,184 B2
(45) Date of Patent: Aug. 10, 2021

(54) MACHINE AND METHOD FOR COMPACTING CERAMIC POWDER

(71) Applicant: SACMI COOPERATIVA MECCANICI IMOLA SOCIETA' COOPERATIVA, Imola (IT)

(72) Inventors: Claudio Ricci, Imola (IT); Stefano Scardovi, Imola (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 132 days.

(21) Appl. No.: 16/307,029

(22) PCT Filed: Jun. 13, 2017

(86) PCT No.: PCT/IB2017/053508
§ 371 (c)(1),
(2) Date: Dec. 4, 2018

(87) PCT Pub. No.: WO2017/216725
PCT Pub. Date: Dec. 21, 2017

(65) Prior Publication Data
US 2019/0217501 A1 Jul. 18, 2019

(30) Foreign Application Priority Data
Jun. 13, 2016 (IT) .................. 102016000060211

(51) Int. Cl.
B28B 17/00 (2006.01)
B28B 5/02 (2006.01)
(Continued)

(52) U.S. Cl.
CPC .......... B28B 17/0081 (2013.01); B28B 3/123 (2013.01); B28B 5/027 (2013.01);
(Continued)

(58) Field of Classification Search
CPC ............ B28B 17/0081; B28B 17/0072; B28B 13/0215; B28B 13/0295; B28B 13/123;
(Continued)

(56) References Cited

U.S. PATENT DOCUMENTS 5,145,627 A * 9/1992 Berion .................... B28B 5/027
264/113

FOREIGN PATENT DOCUMENTS

CN 1738705 A 2/2006
CN 101142153 A 3/2008
(Continued)

OTHER PUBLICATIONS

Cantavella, V., et al. "Use of ultrasound techniques to measure green tile bulk density and optimise the pressing process." Proc. QUALICER, IX World Congress on Ceramic Tile, Castellon, Spain, Feb. 2006. (Year: 2006).*

(Continued)

Primary Examiner — Galen H Hauth
(74) Attorney, Agent, or Firm — Workman Nydegger

(57) ABSTRACT

Machine and method for compacting ceramic powder; a layer of non-compacted ceramic powder is conveyed in a feed direction through a compacting device; downstream of the compacting device there is positioned a detection device which detects the density of the layer of compacted ceramic powder; the quantity of ceramic powder fed to the compacting device is varied in time as a function of what is detected by the detection device to thus regulate the density of the layer of compacted ceramic powder.

12 Claims, 6 Drawing Sheets

(51) Int. Cl.
   *B28B 13/02*      (2006.01)
   *B28B 3/12*       (2006.01)
   *B30B 15/30*      (2006.01)
   *B30B 11/00*      (2006.01)
   *G01N 23/06*      (2018.01)
   *G01N 23/083*     (2018.01)
   *G01N 9/24*       (2006.01)

(52) U.S. Cl.
   CPC ...... *B28B 13/0215* (2013.01); *B28B 13/0295* (2013.01); *B28B 17/0072* (2013.01); *B30B 11/005* (2013.01); *B30B 15/30* (2013.01); *B30B 15/308* (2013.01); *G01N 23/06* (2013.01); *G01N 23/083* (2013.01); *G01N 9/24* (2013.01)

(58) Field of Classification Search
   CPC ...... B28B 15/30; B28B 15/308; G01N 23/06; G01N 23/083
   See application file for complete search history.

(56) References Cited

FOREIGN PATENT DOCUMENTS

| | | |
|---|---|---|
| CN | 101378885 A | 3/2009 |
| CN | 102837837 A | 12/2012 |
| DE | 69015981 T2 | 8/1995 |
| DE | 10217199 C1 | 9/2003 |
| DE | 102013002259 A1 | 8/2014 |
| EP | 0161323 A1 | 11/1985 |
| EP | 0162118 A1 | 11/1985 |
| EP | 1594666 A1 | 11/2005 |
| EP | 1641607 A1 | 4/2006 |
| EP | 2880210 A1 | 6/2015 |
| JP | 03162646 A | 7/1991 |
| JP | 06320520 A | 11/1994 |
| JP | 2000-104102 A | 4/2000 |
| WO | WO-2005005115 A1 * | 1/2005 ......... B28B 13/0215 |
| WO | WO-2007093481 A1 * | 8/2007 ......... B28B 17/0072 |
| WO | 2014/020265 A1 | 2/2014 |

OTHER PUBLICATIONS

International Search Report and Written Opinion issued in PCT/IB2017/053508 dated Oct. 16, 2017.
CIPA Second Office Action for Chinese Application 201780036573-1, dated Dec. 1, 2020.
Observations by third parties received for European Patent Application No. 17745497, dated Mar. 5, 2021, 2 pages.

* cited by examiner

MACHINE AND METHOD FOR COMPACTING CERAMIC POWDER

CROSS REFERENCE TO RELATED APPLICATIONS

This application is a U.S. Nationalization of PCT Application Number PCT/IB2017/053508, filed on Jun. 13, 2017, which claims priority to IT Patent Application No. 102016000060211 filed on Jun. 13, 2016, the entireties of which are incorporated herein by reference.

TECHNICAL FIELD

The present invention relates to a method and a machine for compacting ceramic powder. The present invention also relates to a line and a method for the production of ceramic articles.

BACKGROUND OF THE INVENTION

In normal technology for the production of ceramic tiles, by means of pressing semi-dry powders (ceramic powder; humidity content 5-6%), the fundamental physical parameter to be kept under control during production is the density of the article after compacting. This parameter is an indicator of compaction of the ceramic particles and determines the subsequent behaviours of the article during baking; the more homogeneous the density inside the article is the fewer distortions the article will be subjected to during baking (sintering). Moreover, to ensure the consistency of production, the density value must remain stable throughout the entire production batch, to prevent shrinkage differences (normally 7-8%) that would cause rejections in the finished product (due to dimensional nonconformity).

The technique normally used for measuring density in the ceramic sector is that of weighing using the mercury immersion method. This measurement method enables very accurate density values of the ceramic sample to be obtained, but has some drawbacks, among which we mention the following: it is a destructive measurement process, as the sample measured is taken from a ceramic article (which it then discarded); it is a laborious process, which requires a certain expertise and is not insensitive to change of operator; the use of mercury is potentially dangerous to human health.

In conventional presses with rigid moulds and operating in a discontinuous manner, the main regulation parameter for keeping the density constant is the compacting pressure, i.e. the pressing force related to the working area for loading of the mould. An increase of the compacting pressure determines a corresponding increase of the density of the pressed article, according to a known (non-linear) law.

For this reason, the current technique for regulating conventional ceramic presses provides for closed loop control of the pressure value inside the pressing cylinder (directly proportional to the compacting pressure of the powder). Thickness is instead controlled by recording the end of pressing position of the pressing piston and, if this varies, taking action on the filling height of the mould cavity ("soft" ceramic powder height). Although the "soft" height is varied, the density value does not vary as it is a function only of the compacting pressure.

Recently, machines for the continuous compacting of ceramic powder have been proposed. In some cases, these machines comprise a belt conveyor that supplies the "soft" ceramic powder in a feeding direction through a compacting station in which an upper belt is arranged; this belt converges towards the belt conveyor in the feeding direction and therefore exerts an increasing pressure upon the ceramic powder, compacting it. An example of this type of machine is described in the patent EP2763827B1 by the same applicant as the present application.

In these cases, it is difficult to assess the area on which the force is distributed to obtain a value of compacting pressure equivalent to conventional machines. In this regard, it is noted that compaction of the material takes place gradually (in the feeding direction) and other factors contribute to the efficacy of compaction (internal friction of the material, surface cohesion, moisture content of the slurry, etc.).

Consequently, in a continuous compaction machine, keeping the density of compaction of the slab delivered is less easily correlated to physical parameters for regulation of the system compared to conventional discontinuous machines.

The patent EP1641607B1 by the same applicant as the present application describes a system for regulating the thickness for continuous compacting machines. However, in no way does this regulation system take into consideration regulation and control of density.

In the light of the above, it is evident that machines for compacting ceramic powder have various drawbacks. Among these we mention the fact that to date it is difficult to regulate, in a precise, efficient and rapid manner, and without waste, the density of the layers of ceramic powder obtained following compaction.

The object of the present invention is to provide a method and a machine for compacting ceramic powder and a line and a method for the production of ceramic articles, which enable automatic control of the compaction density and overcome, at least partially, the drawbacks of the prior art and which are, at the same time, easy and inexpensive to produce.

SUMMARY

According to the present invention a method and a machine are provided for compacting ceramic powder and a line for the production of ceramic articles as recited in the independent claims below and, preferably, in any one of the claims depending directly or indirectly on the independent claims.

BRIEF DESCRIPTION OF THE FIGURES

The invention is described below with reference to the accompanying drawings, which illustrate some non-limiting examples of embodiment thereof, wherein.

DETAILED DESCRIPTION

Figure 1:
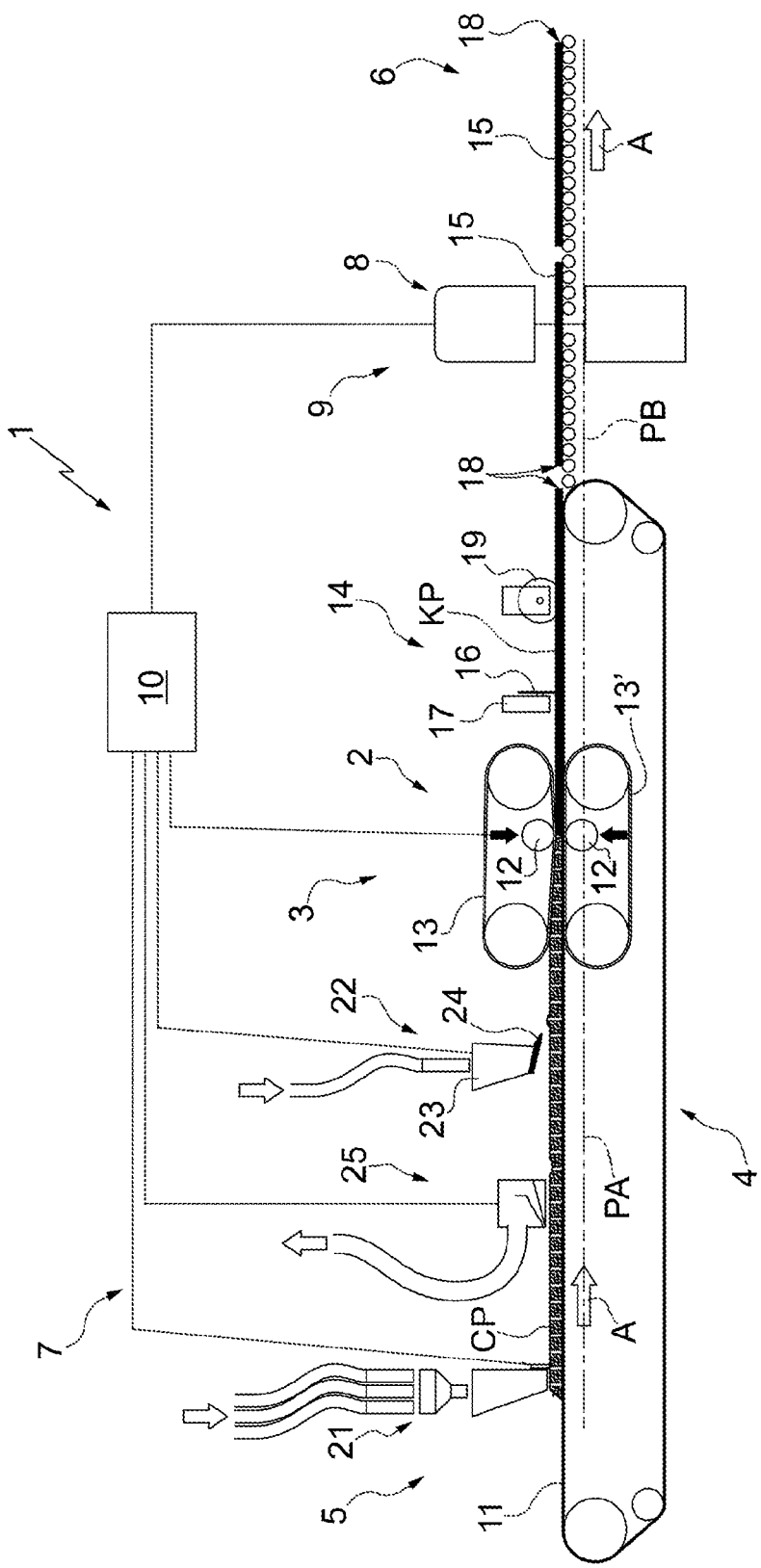
FIG. 1 is a schematic side view of a machine in accordance with the present invention.
Figure 2:
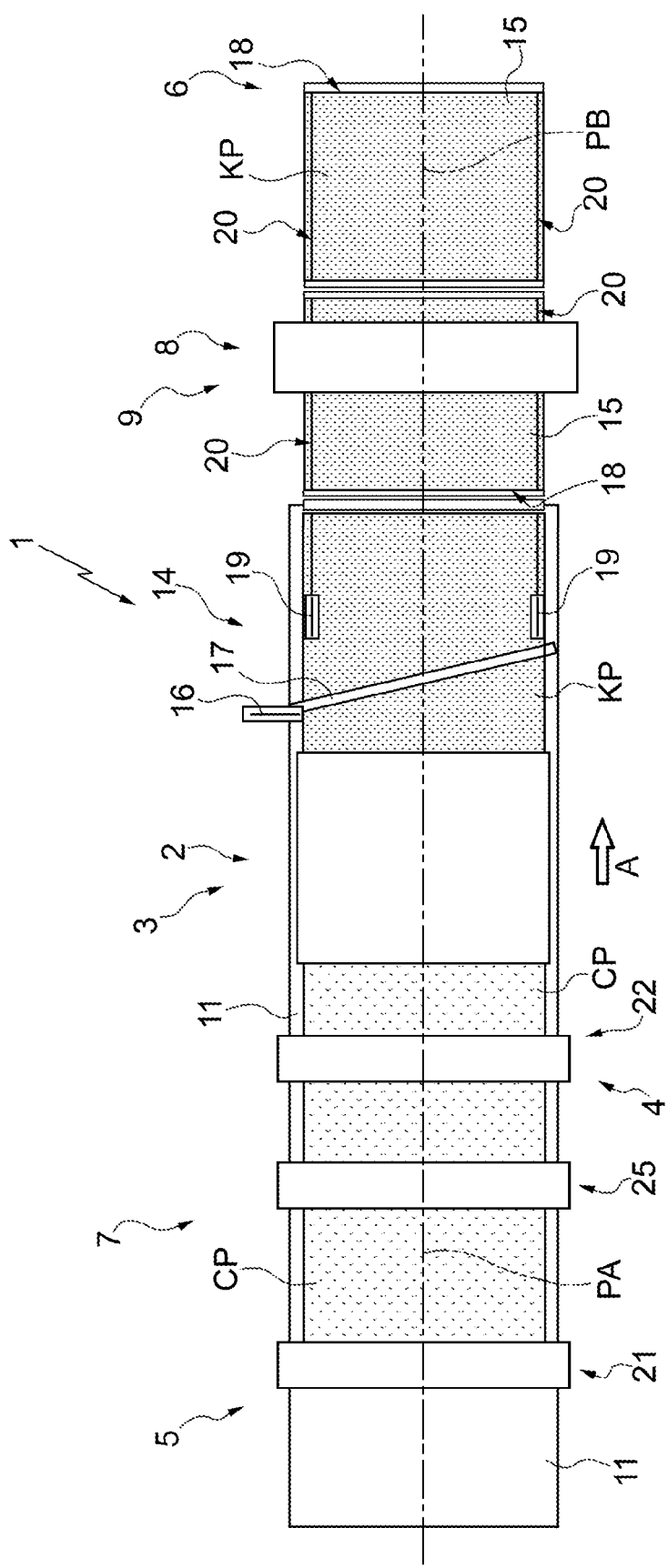
FIG. 2 is a plan view of the machine of FIG. 1.
Figure 3:
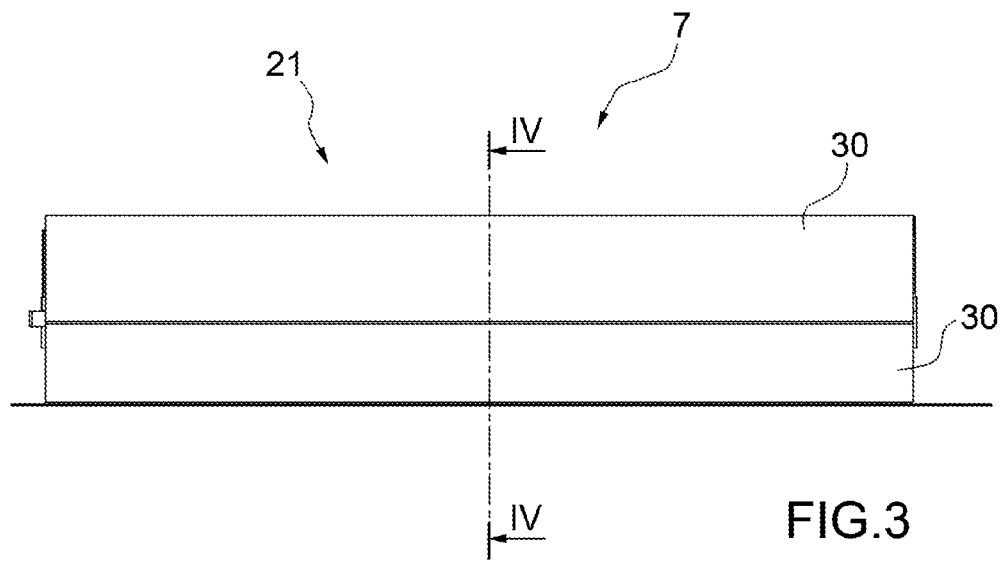
FIG. 3 is a front view of a part of the machine of FIG. 1.

In FIGS. 1 and 2, the numeral 1 indicates as a whole a machine for compacting (non-compacted) ceramic powder CP. The machine 1 comprises a compacting device 2, which is arranged at a working station 3 and is designed to compact the ceramic powder so as to obtain a layer of compacted ceramic powder KP; a conveyor assembly 4 for transporting (in a substantially continuous manner) the ceramic powder CP along a first portion PA of a given path from an input station 5 to the working station 3 and the layer of compacted ceramic powder KP along a second portion PB of the given path from the working station 3 to an output station 6; and a feeding assembly 7, which is designed to feed the ceramic powder CP to the conveyor assembly 4 at the input station 5. In particular, the feeding assembly 7 feeds the ceramic powder to the conveyor assembly 4 in a substantially continuous manner.

Normally, the given path consists of the portions PA and PB.

Moreover, the machine 1 comprises a detection device 8, which is designed to detect the density of the layer of compacted ceramic powder KP and is arranged at a detection station 9; and a control device 10 to control the feeding assembly 7 in order to vary (in time) the quantity of ceramic powder CP supplied by the conveyor assembly to the working station 3 as a function of what is detected (the density of the layer of compacted ceramic powder KP detected) by the detection device 8.

In particular, the control device 10 is designed to control the feeding assembly so that the quantity of ceramic powder CP supplied by the conveyor assembly 4 to the working station 3 increases where the detection device 8 detects a density below a (desired) reference density and decreases where the detection device 8 detects a density above a (desired) reference density.

According to some embodiments, the conveyor assembly 4 comprises a conveyor belt 11 extending (and designed to move) from the input station 5 and through the working station 3, along the (more precisely, part of the) aforesaid given path.

In some cases, the feeding assembly 7 is designed to supply a layer of (non-compacted) ceramic powder CP to the (on the) conveyor belt 11 (at the input station); the compacting device 2 is designed to exert upon the layer of ceramic powder CP a pressure transversely (in particular, normal) to the surface of the belt 11.

In particular, the control device 10 is designed to control the feeding assembly 7 in order to vary (in time) the thickness of the layer of ceramic powder CP as a function of what is detected (of the density of the layer of compacted ceramic powder KP detected) by the detection device 8.

More in particular, the control device 10 is designed to control the feeding assembly so that the thickness of the layer of ceramic powder CP supplied by the feeding assembly 7 on the conveyor belt 11 increases where the detection device 8 detects a density below a (desired) reference density and decreases where the detection device 8 detects a density above a (desired) reference density.

According to some embodiments, in particular, the compacting device 2 comprises at least two compression rollers 12 arranged on opposite sides of (above and below) the conveyor belt 11 so as to exert a pressure upon the ceramic powder CP in order to compact the ceramic powder CP.

Advantageously but not necessarily, the control device 10 (also) controls the compacting device 2 in order to regulate the force exerted by the compacting device 2 on the ceramic powder CP. More precisely, in these cases, the control device regulates the force with which the rollers 12 are pushed towards each other (as a function of the density detected by the detection device).

Although only two rollers 12 are depicted in FIG. 1, in accordance with some variants, it is also possible to provide a plurality of rollers 12 arranged above and below the conveyor belt 11, for example as described in the patent EP1641607B1.

Advantageously (as in the embodiment depicted in FIG. 1), but not necessarily, the compacting device 2 comprises a pressure belt 13, which converges towards the conveyor belt 11 in the feeding direction A in which the conveyor assembly 4 feeds the ceramic powder CP to the compacting device 2. In this way, a (downward) pressure gradually increasing in the direction A is exerted upon the ceramic powder CP so as to compact it. In particular, the pressure belt 13 is (mainly) made of metal (steel) so that it cannot be substantially deformed while pressure is exerted upon the ceramic powder.

According to specific embodiments (such as the one depicted in FIG. 1), the compacting device further comprises a counter-pressure belt 13' arranged on the opposite side of the conveyor belt 11 (in particular, made of rubber or similar material) relative to the pressure belt 13 to cooperate with the conveyor belt 11 to provide a suitable opposition to the downward force exerted by pressure belt 13. In these cases, in particular, the counter-pressure belt 13' is (mainly) made of metal (steel) so that it cannot be substantially deformed while pressure is exerted upon the ceramic powder.

According to some embodiments, not shown, the counter-pressure belt 13' and the conveyor belt 11 coincide. In other words, the conveyor belt 11 is (mainly) made of metal (steel) and the counter pressure belt 13' is absent.

Advantageously, the conveyor belt 11 ends in the area (at the end) of the working station 3. In these cases, the conveyor assembly 4 comprises a further conveyor belt (not illustrated), which is arranged immediately downstream of the compacting device 2 and is designed to feed the compacted ceramic powder KP (in the direction A) at a different speed (in particular, higher) relative to the speed with which the conveyor belt 11 conveys the ceramic powder CP to (and through) the working station 3. More precisely, the speed of the further conveyor belt (not illustrated) adapts (corresponds) to the speed with which the compacted ceramic powder KP is delivered from the compacting device 2.

Alternatively or in addition to the above, according to some embodiments, the feeding assembly 7 is designed to supply a layer of ceramic powder CP (not compacted) to (on) the conveyor assembly 4, which is designed to feed the layer of ceramic powder CP to the compacting device 2 in the feeding direction A.

Advantageously but not necessarily, the detection device 8 is designed to detect the density of areas of the layer of compacted ceramic powder KP that are staggered (not aligned) with one another relative to the feeding direction A (in particular, arranged one relative to the others transversely to the feeding direction). In these cases, the feeding assembly 7 is designed to vary, in a differentiated manner, the thickness of the layer of ceramic powder CP transversely to the feeding direction A. In other words, the feeding assembly 7 is designed to regulate the thickness of the layer of ceramic powder CP so that areas of the layer arranged along a line transverse (in particular, perpendicular) to the direction A have a different thickness to one another. The thickness of each area can be varied in time independently relative to the thickness of the other areas.

In particular, the control device 10 is designed to control the feeding assembly 7 in order to vary, in a differentiated manner, the thickness of the layer of ceramic powder CP transversely (as well as parallel) to the feeding direction A as a function of what is detected (of the density of the layer of compacted ceramic powder KP detected) by the detection device 8.

More in particular, the control device 10 is designed to control the feeding assembly 7 in order to increase the thickness of the layer of ceramic powder CP of areas substantially aligned in the direction A with areas of the layer of compacted ceramic powder KP for which the detection device 8 has detected a density below a (desired) reference density. Analogously, the control device 10 is designed to control the feeding assembly 7 in order to decrease the thickness of the layer of ceramic powder CP of areas substantially aligned in the direction A with areas of the layer of compacted ceramic powder KP for which the detection device 8 has detected a density greater than a (desired) reference density.

According to some embodiments, the control device 10 operates on the basis of the following correlation between variation of density and variation of thickness:

$$\Delta h(y) = -C_1 \cdot \Delta d(y) + C_2 \quad [1]$$

wherein:
$\Delta h(y)$ is a variation of the thickness imposed on the loading of the ceramic powder on the conveyor belt 11 at a transverse position y relative to the direction A;
$\Delta d(y)$ is a variation of the density measured at the transverse position y relative to a mean value $d_m$;
$C_1$, $C_2$ are constants to be evaluated as a function of the material used and of its humidity (obtainable during calibration).

In other words, an increase of the local density relative to the mean value implies a reduction of the loading height in that area.

In particular, the machine 1 further comprises a cutting assembly 14 to transversely cut the layer of compacted ceramic powder KP so as to obtain slabs 15, each of which having a portion of the layer of compacted ceramic powder KP. More in particular, the cutting assembly 14 is arranged along the portion PB of the given path (between the working station 3 and the detection station 8). In some cases, the slabs 15 are formed of compacted ceramic powder KP.

Advantageously, the cutting assembly 14 comprises a cutting blade 16, which is designed to come into contact with the layer of compacted ceramic powder KP to cut it, and a handling unit 17 to move the cutting blade 16 along a diagonal trajectory relative to the direction A. In this way, it is possible to provide the slabs 15 with end edges 18 substantially perpendicular to the direction A while the layer of compacted ceramic powder KP is fed with a continuous motion.

According to some embodiments (such as depicted in FIGS. 1 and 2), the cutting assembly 14 also comprises two further blades 19, which are arranged on opposite sides of the portion PB and are designed to cut the layer of compacted ceramic powder KP and define lateral edges 20 of the slabs 15 substantially perpendicular to the edges 19 (and substantially parallel to the direction A). In some specific cases, the cutting assembly 14 is as described in the patent application published with the number EP1415780.

According to some embodiments (such as illustrated in FIGS. 1 and 2), the feeding assembly 7 comprises a dispensing unit 21, which is designed to feed a base quantity (in particular, a base layer) of ceramic powder CP to the conveyor assembly 4.

In some cases, the feeding assembly 7 also comprises a dispensing unit 22 which is controlled by the control device 10 so as to feed a further quantity of ceramic powder CP to the conveyor assembly in order to vary (in time) the quantity of ceramic powder CP supplied by the feeding assembly 7 to the conveyor assembly 4 as a function of what is detected by the detection device 8. In particular, the dispensing unit 22 is arranged between the dispensing unit 21 and the working station 3 and feeds the ceramic powder on the aforesaid base quantity (layer of ceramic powder).

In some cases, the dispensing unit 22 comprises a plurality of dispensing devices, which are arranged relative to one another transversely (in particular, perpendicularly) to the direction A and can each be activated independently of the others in order to feed additional (variable) quantities of ceramic powder CP downwards onto the base quantity.

More precisely, the dispensing devices are arranged along a direction transverse (in particular, substantially perpendicular) to the direction A.

In particular, the dispensing unit 22 comprises at least one hopper 23 provided with a plurality of lower openings (only one of which is illustrated schematically in FIG. 1) and designed to contain ceramic powder CP. Each dispensing device comprises a distribution element 24 (more precisely a blade) arranged (at a slight distance) under a respective lower opening so that ceramic powder CP can accumulate on the distribution element; and a vibrator device (not illustrated) designed to selectively vibrate the distribution element 24 so that the ceramic powder CP accumulated on the distribution element 24 slides and falls downwards. The control device 10 is designed to selectively activate each vibrator device independently from the other vibrator devices.

According to specific embodiments, the dispensing unit 22 is the same as the dispensing device described in the patent application published with the number WO2009118611 (by the same applicant as the present application).

In addition or alternatively to the dispensing unit 22, according to some embodiments, the feeding assembly 7 also comprises a removing unit 25, which is controlled by the control device 10 to remove a part of the (base quantity of) ceramic powder CP (fed by the dispensing unit 21 to the conveyor assembly 4) in order to vary the quantity of ceramic powder CP supplied by the feeding assembly 7 to the conveyor assembly 4 as a function of what is detected by the detection device 8. The removing unit is arranged between the dispensing unit 21 (in some cases, the dispensing unit 22) and the working station 3. More precisely, the removing unit 25 is adapted to remove the ceramic powder from the aforesaid layer of ceramic powder CP.

In addition or alternatively to the dispensing unit 22 and/or to the removing unit 25, the dispensing unit 21 is controlled by the control device 10 in order to vary the base quantity of ceramic powder CP as a function of what is detected by the detection device 8.

Figure 4:
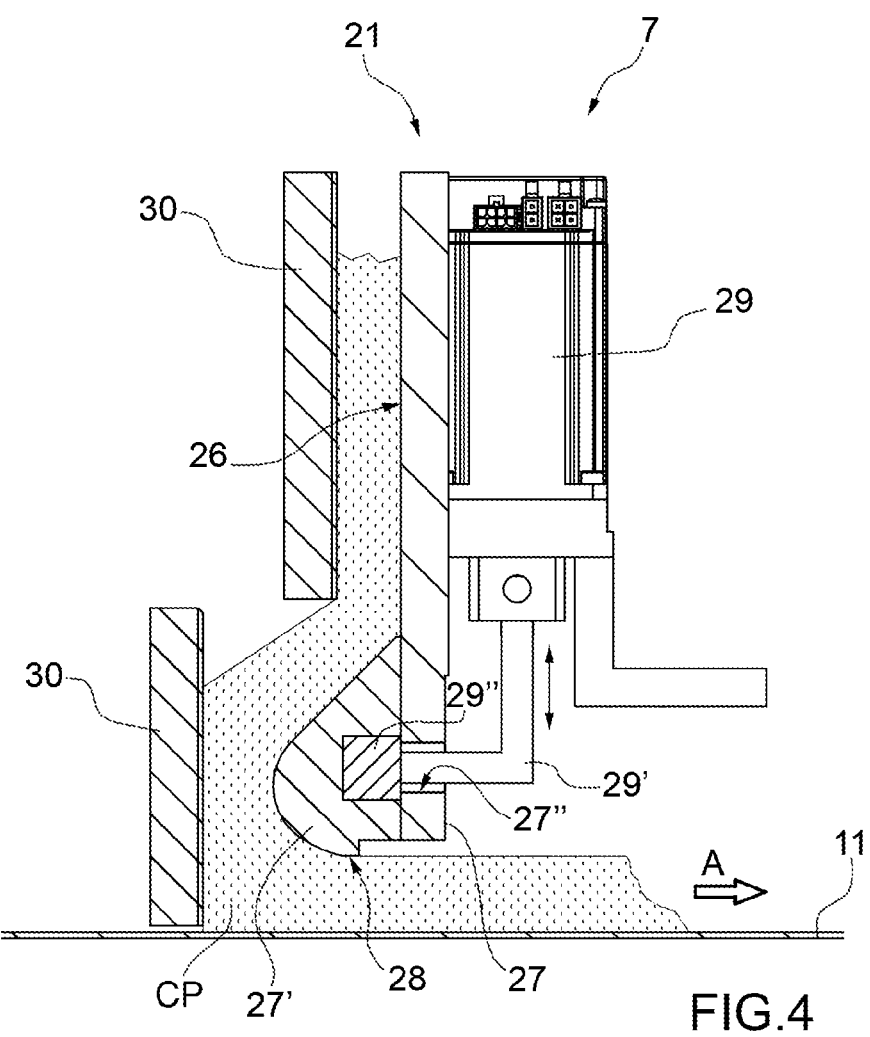
FIG. 4 shows in an enlarged scale a section along the line IV-IV of FIG. 3.
Figure 5:
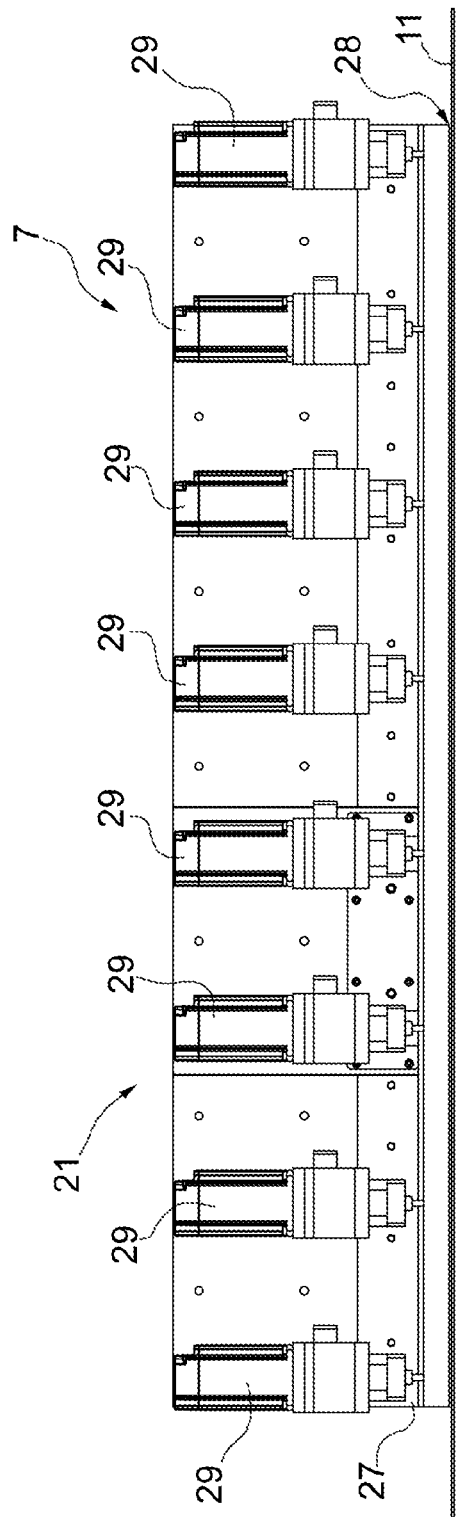
FIG. 5 is a rear view of the part of FIG. 3.
Figure 6:
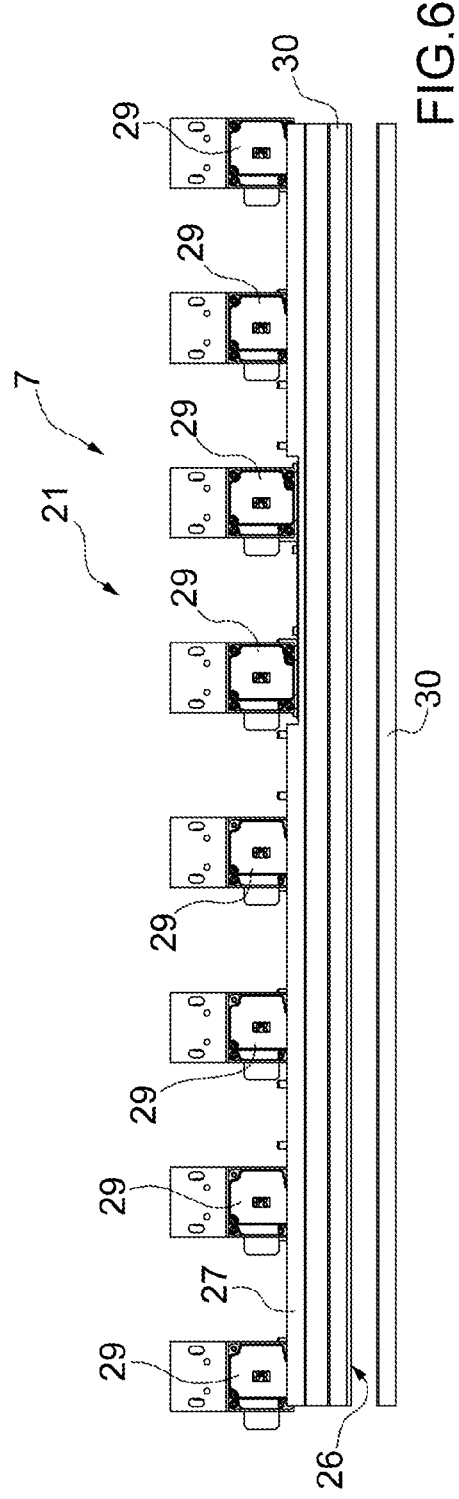
FIG. 6 is a plan view of the part of FIG. 3.

With particular reference to FIG. 4, according to some embodiments, the feeding assembly 7 (more precisely, the dispensing unit 21) is designed to feed a layer of (non-compacted) ceramic powder CP on the conveyor belt 11 in the area of the input station 5 and comprises a partition 27 transverse to the feeding direction A and arranged above the conveyor belt 11 in order to delimit an opening 28 between the partition 27 and the conveyor belt 11, whose height (distance between the partition 27 and the conveyor belt 11) defines the thickness of the layer of ceramic powder CP on the conveyor belt 11. In particular, in use, the layer of ceramic powder CP passes through the opening 28.

In these cases, the feeding assembly 7 comprises at least one actuator 29 to vary the height of the opening 28 (i.e., the distance between the partition 27 and the conveyor belt 11).

The actuator 29 can, for example, comprise (be) an electronically controlled hydraulic actuator and/or a brushless electric motor (more specifically stepping).

In particular, the feeding assembly 7 (more precisely, the dispensing unit 21) comprises a feed channel 26, which is designed to feed the ceramic powder CP at the opening 28. More precisely, the feed channel 26 extends downwards (in order to exploit the force of gravity) and is, in some cases (such as illustrated in FIG. 4), substantially perpendicular.

According to more specific embodiments (such as illustrated in FIGS. 3 to 6 and in FIG. 7), the feeding assembly 7 (more precisely, the dispensing unit 21) comprises a plurality of actuators 29 that are staggered (not aligned) with one another relative to the feeding direction A (in particular, arranged relative to one another transversely to the feeding direction; more in particular, arranged along a line transverse—more precisely substantially perpendicular—to the direction A) and can be operated (designed to be operated) independently of one another in order to (deform a limiting element 27'—described in more detail below—of the partition 27 and, therefore,) vary the height of areas of the opening 28 in a differentiated manner.

In other words, the actuators 29 can be operated so that the distance between the partition 27 (in particular, the limiting element 27') and the conveyor belt 11 is varied in a differentiated manner transversely to the feeding direction A.

More precisely, the control device 10 is designed to operate the actuators 29 independently from one another in order to (deform the limiting element 27' and, therefore,) vary the height of areas of the opening 28 in a differentiated manner.

In addition or alternatively (FIGS. 3 to 6), the partition 27 comprises (is made of) an elastically deformable material (typically, an elastomer). In these cases, the actuators 29 are (also) designed to deform the partition 27 so that a lower edge of the partition 27 moves towards or away from the conveyor belt 11. More precisely, each actuator 29 is designed to deform a different part of the partition 27. In this way, by operating the actuators 29 independently from one another, it is possible to vary the height of areas of the opening 28 in a differentiated manner.

In some cases, the partition 27 comprises a limiting element 27' (made of elastically deformable material, for example rubber or the like), which is arranged at a lower end of the partition 27 (above the conveyor belt 11) and is designed to define the height of the opening 28 (and, therefore, the thickness of the layer of ceramic powder CP on the conveyor belt 11). More precisely, the lower edge of the limiting element 27' is designed to define the profile of the transverse section of the layer of ceramic powder CP. In particular, the limiting element 27' comprises (is) a strip of elastically deformable material, said strip extending transversely (in particular, perpendicularly) to the direction A.

In these cases, the actuator 29 is designed to vary the position (and the shape) of the limiting element 27'.

In particular, the actuator 29 is provided with (at least) a connection element 29' (more precisely, an L-shaped arm) which is attached to the limiting element 27' and extends through a slit 27" of the partition 27. The slit 27" has a height greater than the thickness of the connection element 29' and thus allows the connection element 29' to have clearance to move vertically.

According to some embodiments (such as illustrated in FIG. 4), the connection element 29' is attached to the limiting element 27' by means of an insert 29" embedded in the limiting element 27'.

In some cases (as better illustrated in FIGS. 1 and 2), the feeding assembly 7 (more precisely, the dispensing unit 21) comprises one or more rear walls 30, which (together with the partition 27) delimit (at least a portion) of the feed channel 26.

Figure 7:
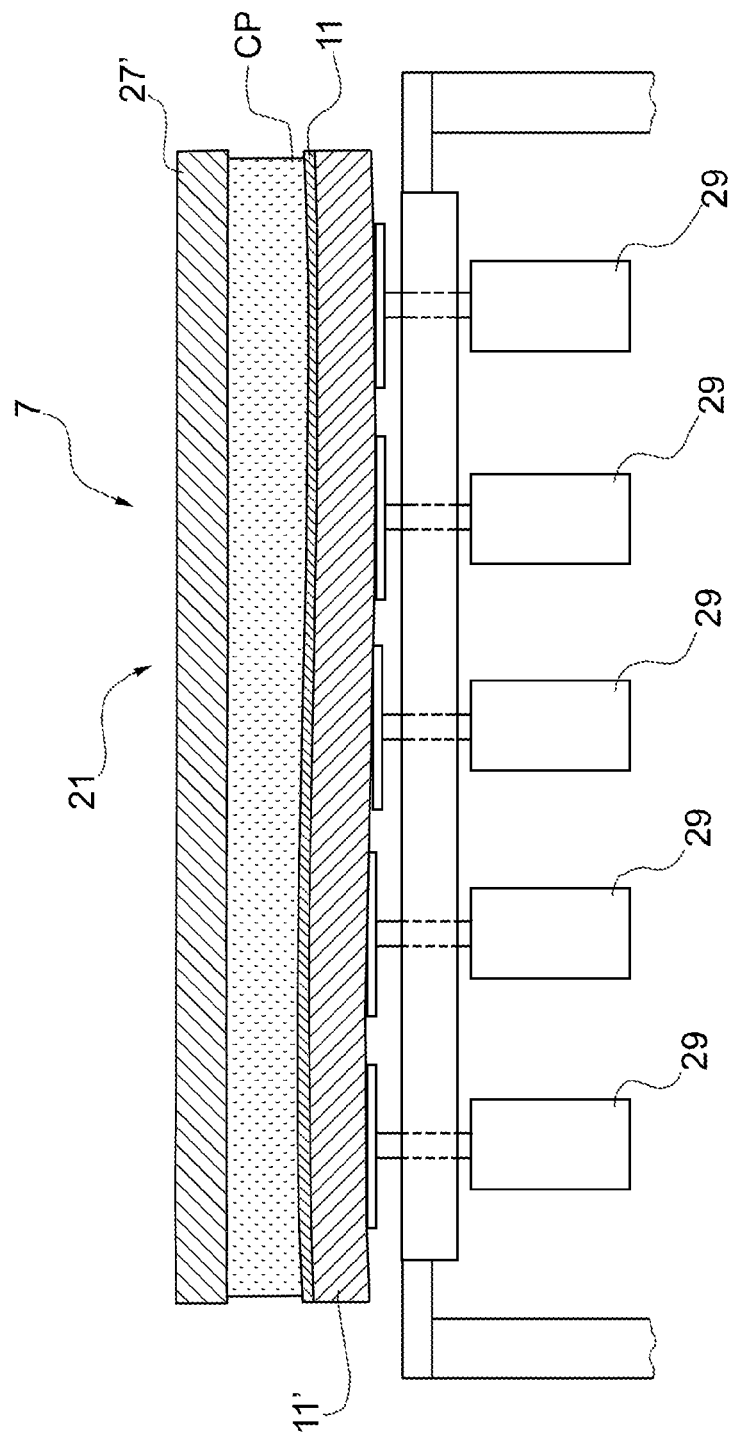
FIG. 7 schematically illustrates a section of a further part of the machine of FIG. 1.

In accordance with the embodiment illustrated in FIG. 7, the actuator 29 is arranged (in particular, the actuators 29 are arranged) on the opposite side of the conveyor belt 11 relative to the partition 27 and is designed (in particular, are designed) to deform the conveyor belt 11 in order to change (reduce) the height of the opening 28 (more precisely, the height of the aforesaid areas of the opening 28).

Also in this case, more precisely, a plurality of actuators 29 are provided, arranged transversely to the direction A to vary, in a differentiated manner, the height of the aforesaid areas of the opening 28.

Advantageously but not necessarily, the feeding assembly 7 also comprises a plate 11' fixed and elastically deformable, which is arranged in the area of the input station 5 between the actuators and the conveyor belt 11 (and on which the conveyor belt 11 runs). In this way, the conveyor belt 11 can move on a continuous surface and the risks of damage are reduced.

According to specific embodiments, the feeding assembly 7 (in particular, the dispensing unit 21) comprises (is) an apparatus as described in the patent application published with the number EP2050549A2 (by the same applicant as the present patent application).

Advantageously, but not necessarily (see FIG. 8), the detection device 8 comprises an emission unit 31, which is designed to emit a signal 32 towards the layer of compacted ceramic powder KP and a receiving unit 33, which is arranged on the opposite side of the second portion PB of the given path relative to the emission unit 31 and is designed to receive a signal 34 that comes from the emission unit 31 and has passed through the layer of compacted ceramic powder (KP). The signal 32 is chosen from the group consisting of: X radiation, γ (gamma) radiation, ultrasound signal and a combination thereof. In some cases, the signal 32 is chosen from the group consisting of: X radiation, ultrasound signal and a combination thereof.

In particular, the detection device 8 comprises a measuring unit 35 for calculating the thickness of the layer of compacted ceramic powder KP. More in particular, the measuring unit 35 comprises two distance sensors 36, which detect the distance from the upper surface and lower surface of the layer of compacted ceramic powder KP and, through the difference (relative to a fixed reference distance), determine the thickness. Typically, the emission unit 31 and the receiving unit 33 are arranged a few millimetres downstream of the measuring unit 35 along the second portion PB.

Advantageously, but not necessarily, the emission unit 31 and the receiving unit 33 are mounted on assemblies moving on guides arranged transversely (perpendicularly) to the feeding direction A. The control device 10 can therefore shift the measurement point along the whole width of the layer of compacted ceramic powder KP, so as to determine a density profile $\rho(y)$, in which y is the coordinate transverse to the direction A. Each point of said profile $\rho(y)$ is in actual fact the mean of numerous readings taken close together by the system in a given time (e.g. 100 readings in 1 second). In this way, it is possible to detect a local but in any case mean value, processing the results obtained with statistical tools, thereby also making it possible to measure layers of compacted ceramic powder KP having an irregular (structured) upper surface.

According to further embodiments, it is also possible to use a plurality of emission units 31 and reception units 33 in order to simultaneously monitor the density of several areas of the layer of compacted ceramic powder KP.

During normal production of ceramic slabs 15, the detection device 8 can, therefore, continuously monitor the trend of the density of the material, accumulating information in the form of density profiles.

This information is used by the control device 10 to accordingly adjust the transverse loading rule h(y) according to the relation [1].

According to some embodiments, the signal 32 comprises (is) X (or γ) radiations. In these cases, by processing the absorption signal of the X radiation (difference between the intensity of 32 and 34) and taking account of the thickness measured with the sensors 36 information correlated to the density of the material is obtained, through the Lambert-Beer law:

$$\ln(I_0/I_1)=A=\varepsilon h\rho \quad [2]$$

wherein:
$I_0$ equals intensity of the X radiation received;
$I_1$ equals intensity of the X radiation transmitted;
A equals absorbance;
h equals thickness of the material;
ρ equals density of the material;
ε equals absorption coefficient (constant for the material).

The relation [2] can thus be expressed to obtain the density $$\rho=A\varepsilon h=\ln(I_0/I_1)\varepsilon h$$

Therefore, measuring the thickness h (by means of the sensors 36), detecting the intensity of the radiation emitted $I_0$ and the intensity of the radiation $I_1$ delivered after having passed through the ceramic piece, knowing the constant of the material ε, the density ρ is determined. When the material is changed, measurement of the constant ε must be repeated (calibration procedure).

In accordance with specific embodiments, the detection device 8 is as described in the patent application published with the number JPH03162646.

According to further embodiments (again with reference to FIG. 8), the signal 32 comprises (is) an ultrasound signal and, therefore, the emission unit 31 comprises (is) an ultrasound generator and the receiving unit 33 comprises (is) an ultrasound detector. In use, the emission unit 31 and receiving unit 33 measure the time required to pass through the layer of compacted ceramic powder KP. Knowing the thickness, the speed v of the ultrasound wave in the material is determined, from which through the relation $$p=f(\mu)v^2$$

wherein f(μ) and E are constants of the material (obtainable by means of calibration), the density ρ of the material is obtained.

In accordance with specific embodiments, the detection device 8 is as described in the patent application published with the number WO2007/093481A1 (by the same applicant as the present patent application).

Figure 8:
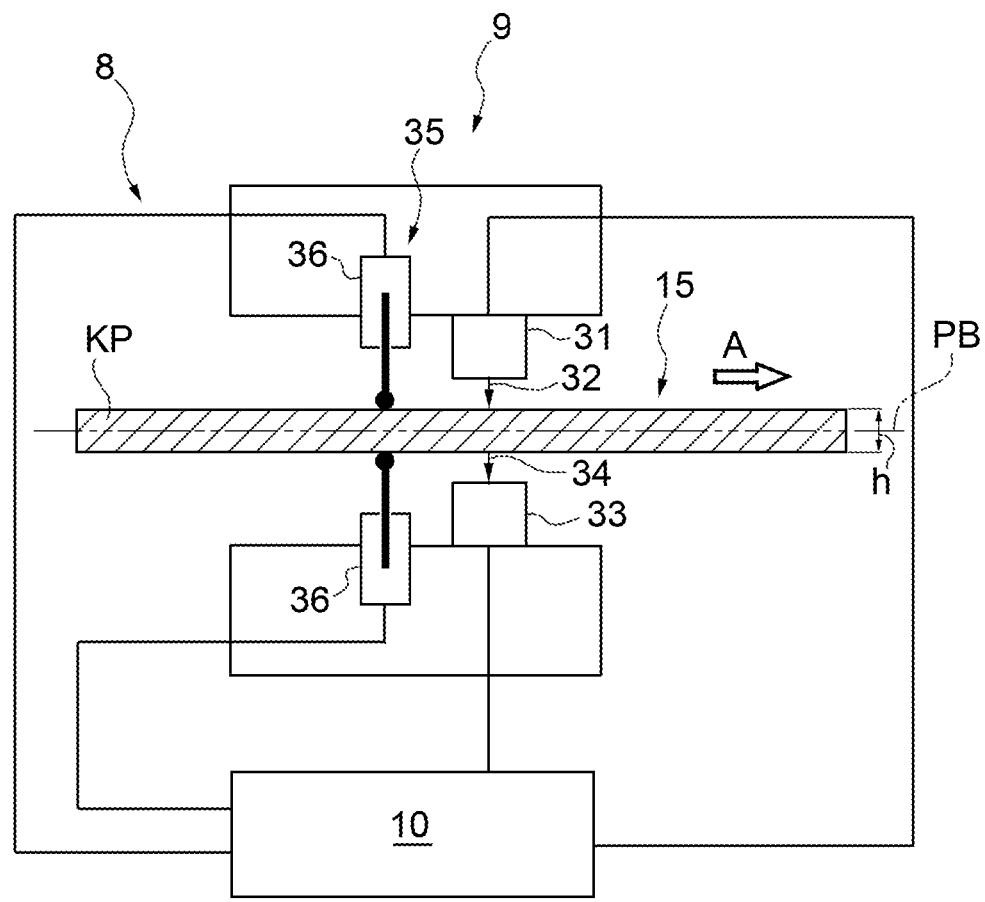
FIG. 8 schematically illustrates the structure of a detail of the machine of FIG. 1.

According to some embodiments (such as illustrated in FIG. 8), the control device 10 directly processes (as indicated above) the signals of the detection device 8 (more precisely, of the emission unit 21, the receiving unit 33 and the measuring unit 35). Alternatively, the detection device 8 includes a processing unit designed to provide the control device 10 with the density data.

In accordance with a second aspect of the present invention, there is provided a line for the production of ceramic articles (more precisely, tiles) comprising at least one machine 1 for compacting ceramic powder. The machine 1 is as defined above and is provided with the cutting assembly 14 to transversely cut the layer of compacted ceramic powder KP so as to obtain slabs 15, each having a portion of the layer of compacted ceramic powder KP.

The line also comprises at least one baking oven (of a known type and not illustrated) to sinter the compacted ceramic powder of the slabs 15 so as to obtain the ceramic articles.

According to some embodiments, the line also comprises a drying oven (of a known type and not illustrated) arranged upstream of the baking oven and operating at a lower temperature to the baking oven to reduce the water content of the slabs 15.

In accordance with a further aspect of the present invention, there is provided a method for compacting ceramic powder CP. In particular, the method is implemented by the machine 1 as described above.

More precisely, the method comprises a compacting step, during which the (a layer of) ceramic powder CP is compacted at a working station 3 in order to obtain (a layer of) compacted ceramic powder KP; a conveying step, during which the ceramic powder CP is conveyed along a first portion PA of a given path from an input station 5 to the (more precisely, through the) working station 3 and the (layer of) compacted ceramic powder KP is conveyed along a second portion PB of the given path from the working station 3 to an output station 6; and a feeding step, during which the ceramic powder CP is fed to the input station 5. In particular, the compacting step and the conveying step are substantially simultaneous.

The method also comprises: a detection step, during which the density of the (layer of) compacted ceramic powder KP is detected in the area of a detection station 9 arranged along the second portion PB of the given path; and a control step, during which the quantity of ceramic powder CP fed through the working station 3 varies (in time) as a function of what is detected (of the density of the layer of compacted ceramic powder KP detected) during the detection step. In particular, during the control step the quantity of ceramic powder fed (during the feeding step) to the input station varies (in time) as a function of what is detected (of the density of the layer of compacted ceramic powder KP detected) during the detection step.

According to some embodiments, during the feeding step, a layer of (non-compacted) ceramic powder CP is fed to the input station 5; during the conveying step, the layer of ceramic powder CP is conveyed through the working station 3 in a feeding direction A; during the detection step, the density is detected of areas of the layer of compacted ceramic powder KP, which are staggered (not aligned) with one another relative to the feeding direction A (in particular, arranged one relative to the other transversely to the feeding direction); during the feeding step, the thickness of the layer of ceramic powder CP is varied, in a differentiated manner, transversely to the feeding direction A as a function of what is detected (of the density of the layer of compacted ceramic powder KP detected) during the detection step.

In accordance with a further aspect of the present invention, there is also provided a method for the production of ceramic articles, which comprises the aforesaid method for compacting ceramic powder; a cutting step to transversely cut the layer of compacted ceramic powder (KP) so as to obtain slabs (15), each having a portion of the layer of compacted ceramic powder (KP); and a baking step to sinter the compacted ceramic powder (KP) of the slabs (15) in order to obtain ceramic articles.

Advantageously, the method for the production of ceramic articles also comprises a drying step (of known type and not illustrated), during which the water content of the slabs 15 is reduced; the drying step precedes the baking step and takes place at a lower temperature than the baking step.

In particular, the method for the production of ceramic articles is implemented by the line for the production of ceramic articles described above.

The invention claimed is:

1. A machine for compacting ceramic powder, the machine comprising:
   a compacting device, which is arranged in the area of a working station and is designed to compact the ceramic powder so as to obtain a layer of compacted ceramic powder;
   a conveyor assembly to transport, in a substantially continuous manner, the ceramic powder along a first portion of a given path from an input station to the working station and the layer of compacted ceramic powder along a second portion of the given path from the working station to an output station;
   a feeding assembly, which is designed to feed the ceramic powder to the conveyor assembly in the area of the input station;
   a detection device, which is designed to detect a density of the layer of compacted ceramic powder and is arranged in the area of a detection station along the second portion of the given path; and
   a control device to control the feeding assembly so as to vary, in time, a quantity of ceramic powder supplied by the conveyor assembly to the working station as a function of what is detected by the detection device,
   wherein the conveyor assembly comprises a conveyor belt extending along the given path, from the input station and through the working station in a feeding direction,
   wherein the feeding assembly is designed to feed a layer of non-compacted ceramic powder on the conveyor belt in the area of the input station and comprises a partition, which is transverse to the feeding direction and is arranged above the conveyor belt, so as to delimit an opening between the partition and the conveyor belt, whose height defines a thickness of the layer of ceramic powder,
   wherein the feeding assembly comprises at least one actuator to vary the distance between the partition and the conveyor belt, and
   wherein the feeding assembly comprises a plurality of actuators, which are not aligned with one another relative to the feeding direction and can be operated independently of one another, so as to vary the height of areas of the opening in a differentiated manner.

2. The machine according to claim 1, wherein the conveyor assembly is designed to feed the layer of ceramic powder to the compacting device in a feeding direction;
   the detection device is designed to detect the density of areas of the layer of compacted ceramic powder that are staggered with one another relative to the feeding direction;
   the feeding assembly is designed to vary, in a differentiated manner, the thickness of the layer of ceramic powder transversely to the feeding direction; and
   the control device is designed to control the feeding assembly so as to vary, in a differentiated manner, the thickness of the layer of ceramic powder transversely to the feeding direction as a function of what is detected by the detection device.

3. The machine according to claim 1, wherein the compacting device is designed to exert a transverse pressure upon the layer of ceramic powder, the compacting device comprises at least two compression rollers, which are arranged on opposite sides of the conveyor belt so as to exert a pressure upon the ceramic powder in order to compact the ceramic powder itself.

4. The machine according to claim 1, further comprising a cutting assembly to transversely cut the layer of compacted ceramic powder so as to obtain slabs, each having a portion of the layer of compacted ceramic powder, the cutting assembly being arranged along the second portion of the given path between the working station and the detection station.

5. The machine according to claim 1, wherein the feeding assembly comprises:
   a first dispensing unit, which is designed to feed a base quantity of ceramic powder to the conveyor assembly; and
   a second dispensing unit, which is controlled by the control device so as to feed a further quantity of ceramic powder to the conveyor assembly in order to vary the quantity of ceramic powder supplied by the feeding assembly to the conveyor assembly as a function of what is detected by the detection device, wherein the second dispensing unit is arranged between the first dispensing unit and the working station and feeds the ceramic powder on said base quantity.

6. The machine according to claim 1, wherein the feeding assembly comprises:
   a first dispensing unit, which is designed to feed a base quantity of ceramic powder to the conveyor assembly; and
   a removing unit, which is controlled by the control device so as to remove part of the quantity of ceramic powder in order to vary the quantity of ceramic powder supplied by the feeding assembly to the conveyor assembly as a function of what is detected by the detection device, wherein the removing unit is arranged between the first dispensing unit and the working station and is designed to remove ceramic powder from said layer of ceramic powder.

7. The machine according to claim 5, wherein the first dispensing unit is controlled by the control device so as to vary the base quantity of ceramic powder as a function of what is detected by the detection device.

8. The machine according to claim 1, wherein the actuators are arranged on the opposite side of the conveyor belt relative to the partition and are designed to deform the conveyor belt so as to change the height of said areas of the opening.

9. The machine according to claim 1, wherein the detection device comprises a emission unit, which is designed to emit a signal towards the layer of compacted ceramic powder, and a receiving unit, which is arranged on the opposite side of the second portion of the given path relative to the emission unit and is designed to receive the signal that comes from the emission unit and has passed through the layer of compacted ceramic powder, the signal being chosen in the group consisting of: X radiation, γ (gamma) radiation, ultrasound signal and a combination thereof.

10. A line for production of ceramic articles; the line comprises at least one machine for compacting ceramic powder according to claim 1, which is provided with a cutting assembly to transversely cut the layer of compacted ceramic powder so as to obtain slabs, each having a portion of the layer of compacted ceramic powder; and at least one baking oven to sinter the compacted ceramic powder of the slabs so as to obtain the ceramic articles.

11. A method for compacting ceramic powder; the method comprising:
- a compacting step, during which the ceramic powder is compacted in the area of a working station so as to obtain a layer of compacted ceramic powder;
- a conveying step, during which the ceramic powder is transported along a first portion of a given path from an input station to the working station and the layer of compacted ceramic powder is conveyed along a second portion of the given path from the working station to an output station;
- a feeding step, during which the ceramic powder is fed to the input station;
- a detection step, during which the density of the layer of compacted ceramic powder is detected in the area of a detection station arranged along the second portion of the given path; and
- a control step, during which the quantity of ceramic powder fed through the working station is varied in time as a function of what is detected during the detection step, wherein the conveying step is carried out by a conveyor assembly comprising a conveyor belt extending along the given path, from the input station and through the working station in a feeding direction, wherein the feeding step is carried out by a feeding assembly, which feeds a layer of ceramic powder on the conveyor belt in the area of the input station and comprises a partition, which is transverse to the feeding direction and is arranged above the conveyor belt, so as to delimit an opening between the partition and the conveyor belt, whose height defines the thickness of the layer of ceramic powder, and wherein the feeding assembly comprises a plurality of actuators, which are not aligned with one another relative to the feeding direction and are operated independently of one another, so as to vary the height of areas of the opening in a differentiated manner.

12. The method according to claim 11, wherein
during the conveying step, the layer of ceramic powder is conveyed through the working station in the feeding direction;
during the detection step, the density is detected of areas of the layer of compacted ceramic powder, which are staggered with one another relative to the feeding direction; and
during the feeding step, the thickness of the layer of ceramic powder is varied, in a differentiated manner, transversely to the feeding direction as a function of what is detected during the detection step.

* * * * *